US010822100B2

(12) United States Patent
Dindar et al.

(10) Patent No.: US 10,822,100 B2
(45) Date of Patent: Nov. 3, 2020

(54) HYBRID ELECTRIC PROPULSION SYSTEM FOR AN AIRCRAFT

(71) Applicant: General Electric Company, Schenectady, NY (US)

(72) Inventors: Mustafa Dindar, Cincinnati, OH (US); Keith E J Blodgett, Milford, OH (US)

(73) Assignee: General Electric Company, Schenectady, NY (US)

(*) Notice: Subject to any disclaimer, the term of this patent is extended or adjusted under 35 U.S.C. 154(b) by 729 days.

(21) Appl. No.: 15/632,846

(22) Filed: Jun. 26, 2017

(65) Prior Publication Data

US 2018/0370641 A1 Dec. 27, 2018

(51) Int. Cl.

| | |
|---|---|
| ***B64D 27/24*** | (2006.01) |
| ***F02K 5/00*** | (2006.01) |
| ***B64D 27/02*** | (2006.01) |
| ***B64D 27/20*** | (2006.01) |
| ***B64D 27/10*** | (2006.01) |
| ***F01D 15/10*** | (2006.01) |
| ***F01D 17/10*** | (2006.01) |

(Continued)

(52) U.S. Cl.

CPC ............ *B64D 27/24* (2013.01); *B64D 27/02* (2013.01); *B64D 27/10* (2013.01); *B64D 27/20* (2013.01); *F01D 15/10* (2013.01); *F01D 17/10* (2013.01); *F02K 5/00* (2013.01); *H02K 7/1823* (2013.01); *B64D 2027/026* (2013.01); *F02C 3/04* (2013.01); *F05D 2220/323* (2013.01); *F05D 2240/35* (2013.01)

(58) Field of Classification Search

CPC ........ B64D 27/24; B64D 27/02; B64D 27/10; B64D 27/20

See application file for complete search history.

(56) References Cited

U.S. PATENT DOCUMENTS

| | | | |
|---|---|---|---|
| 4,088,285 | A | 5/1978 | Sogabe et al. |
| 5,150,571 | A | 9/1992 | Herzog |

(Continued)

FOREIGN PATENT DOCUMENTS

| | | | |
|---|---|---|---|
| DE | 102010049885 | A1 | 5/2012 |
| DE | 102013209538 | A1 | 11/2014 |

(Continued)

OTHER PUBLICATIONS

Canadian Office Action Corresponding to Application No. 3008309 dated May 1, 2019.

(Continued)

*Primary Examiner* — Justin M Benedik

(74) *Attorney, Agent, or Firm* — Dority & Manning, P.A.

(57) ABSTRACT

A propulsion system for an aircraft includes a propulsor; a turbomachine mechanically coupled to the propulsor for driving the propulsor during a combustion operating mode of the propulsion system and mechanically decoupled from the propulsor during an electric operating mode of the propulsion system; and an electrical power source. The propulsion system further includes an electric machine, the electric machine being electrically coupled to the electrical power source and mechanically coupled to the propulsor during the electric operating mode of the propulsion system such that the electric machine drives the propulsor during the electric operating mode of the propulsion system.

20 Claims, 6 Drawing Sheets

(51) Int. Cl.
*H02K 7/18* (2006.01)
*F02C 3/04* (2006.01)

(56) References Cited

U.S. PATENT DOCUMENTS

| | | | | |
|---|---|---|---|---|
| 8,099,944 | B2 | 1/2012 | Foster et al. | |
| 8,640,439 | B2 | 2/2014 | Hoffjann et al. | |
| 8,957,539 | B1 * | 2/2015 | Ralston | F01D 15/10 290/52 |
| 9,194,285 | B2 | 11/2015 | Botti et al. | |
| 9,212,625 | B2 | 12/2015 | Shelley | |
| 10,017,270 | B2 | 7/2018 | Becker et al. | |
| 2006/0137355 | A1 | 6/2006 | Welch et al. | |
| 2009/0293494 | A1 * | 12/2009 | Hoffjann | B64D 27/02 60/780 |
| 2013/0038057 | A1 | 2/2013 | McLoughlin et al. | |
| 2016/0214727 | A1 | 7/2016 | Hamel et al. | |
| 2016/0257416 | A1 | 9/2016 | Himmelmann et al. | |
| 2016/0332741 | A1 | 11/2016 | Moxon | |
| 2016/0355272 | A1 | 12/2016 | Moxon | |
| 2017/0081035 | A1 | 3/2017 | Becker et al. | |

FOREIGN PATENT DOCUMENTS

| | | | |
|---|---|---|---|
| EP | 2924247 | A1 | 9/2015 |
| EP | 2962885 | A1 | 1/2016 |
| EP | 3153401 | A1 | 4/2017 |
| JP | 2013/194636 | A | 9/2013 |
| JP | 2016/135671 | A | 7/2016 |

OTHER PUBLICATIONS

European Search Report Corresponding to Application No. 18179355.5 dated Oct. 26, 2018.

Warwick, When Will These Civil Aircraft Concepts Fly, Aviation Week & Space Technology, Jan. 27, 2017, pp. 1-9. https://aviationweek.com/technology/when-will-these-civil-aircraft-concepts-fly#slide-0-field_images-1570041.

Wikipedia, Ryan FR Fireball, Last Edited Jul. 17, 2019, pp. 1-6 https://en.wikipedia.org/wiki/Ryan_FR_Fireball.

Machine Translated Japanese Office Action Corresponding to Application No. 2018116550 on Oct. 4, 2019.

European Office Action Corresponding to Application No. 18179355 on Feb. 25, 2020.

* cited by examiner

HYBRID ELECTRIC PROPULSION SYSTEM FOR AN AIRCRAFT

FIELD

The present subject matter relates generally to an aircraft propulsion system and more particularly to an aircraft propulsion system including a hybrid electrical propulsion engine.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft also has an effect on the net propulsive thrust of the aircraft. A total amount of drag on the aircraft is generally proportional to a difference between a freestream velocity of air approaching the aircraft and an average velocity of a wake downstream from the aircraft that is produced due to the drag on the aircraft. Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although these systems may reduce a drag on the aircraft by reenergizing the boundary layer airflow, such systems can nevertheless result in an inefficient system given the inclusion of combustion engine(s) required to drive such system.

Accordingly, a propulsion system including one or more components for reducing an amount of drag on the aircraft would be useful. More particularly, a propulsion system including an efficient propulsion engine for reducing an amount of drag on the aircraft would be especially beneficial.

BRIEF DESCRIPTION

Aspects and advantages of the invention will be set forth in part in the following description, or may be obvious from the description, or may be learned through practice of the invention.

In one exemplary embodiment of the present disclosure, a propulsion system for an aircraft is provided. The propulsion system includes a propulsor; a turbomachine mechanically coupled to the propulsor for driving the propulsor during a combustion operating mode of the propulsion system and mechanically decoupled from the propulsor during an electric operating mode of the propulsion system; and an electrical power source. The propulsion system further includes an electric machine, the electric machine being electrically coupled to the electrical power source and mechanically coupled to the propulsor during the electric operating mode of the propulsion system such that the electric machine drives the propulsor during the electric operating mode of the propulsion system.

In certain exemplary embodiments the turbomachine defines an inlet, and wherein the turbomachine further includes a forward variable geometry component for at least partially closing off the inlet when the propulsion system is operating in the electric operating mode. For example, in certain exemplary embodiments the turbomachine further defines an exhaust, and wherein the turbomachine further includes an aft variable geometry component for at least partially closing off the exhaust when the propulsion system is operating in the electric operating mode.

In certain exemplary embodiments the propulsor is configured as an aft fan. For example, in certain exemplary embodiments the aft fan is a boundary layer ingestion fan configured to ingest a boundary layer airflow over at least a portion of the aircraft during operation.

In certain exemplary embodiments the electric machine is an electric motor configured to be positioned within a fuselage of the aircraft when installed.

In certain exemplary embodiments the electrical power source is an electric energy storage unit. For example, in certain exemplary embodiments the propulsion system further includes an electric generator mechanically coupled to the turbomachine, wherein the electric generator is electrically coupled to the electric energy storage unit.

For example, in certain exemplary embodiments the electric generator is positioned within an aft end of the turbomachine.

In certain exemplary embodiments the propulsion system further includes a clutch configured to mechanically couple the turbomachine and the propulsor when the propulsion system is operable in the combustion operating mode, and further configured to mechanically decouple the turbomachine from the propulsor when the propulsion system is operable in the electric operating mode.

In certain exemplary embodiments the electric machine is an electric motor/generator configured to generate electrical power when the propulsion system is in the combustion operating mode and further configured to drive the propulsor when the propulsion system is in the electrical operating mode.

In an exemplary aspect of the present disclosure, a method is provided for operating a propulsion system for an aircraft. The propulsion system includes a propulsor, a turbomachine, an electrical power source, and an electric machine. The method including operating the propulsion system in a combustion operating mode, wherein operating the propulsion system in the combustion operating mode includes driving the propulsor with the turbomachine to provide a propulsive benefit for the aircraft. The method additionally including operating the propulsion system in an electric operating mode, wherein operating the propulsion system in the electric operating mode includes providing electrical power from the electrical power source to the electric machine and driving the propulsor with the electric machine.

In certain exemplary aspects operating the propulsion system in the electric operating mode further includes decoupling the turbomachine from the propulsor.

In certain exemplary aspects operating the propulsion system in the electric operating mode further includes operating the aircraft in a cruise operating mode.

In certain exemplary aspects operating the propulsion system in the combustion operating mode includes operating the aircraft in a high power operating mode.

In certain exemplary aspects the propulsion system further includes an electrical generator, and wherein operating the propulsion system in the combustion operating mode includes rotating the electric generator of the propulsion system with the turbomachine to generate electrical power. For example, in certain exemplary aspects the electrical power source is an electric energy storage unit, and wherein rotating the electric generator with the turbomachine to generate electrical power includes transferring electrical power from the electric generator to the electric energy storage unit.

In certain exemplary aspects the electric machine is an electric motor/generator, wherein operating the propulsion system in the combustion operating mode further includes extracting electrical power from the turbomachine using the electric motor/generator.

In certain exemplary aspects the method further includes operating the propulsion system in a windmilling operating mode, wherein operating the propulsion system in the windmilling operating mode includes driving the electric machine with the propulsor to generate electrical power and transferring electrical power from the electric machine to the electrical power source.

In certain exemplary aspects operating the propulsion system in the electric operating mode further includes closing off an inlet to the turbomachine using a variable geometry component of the turbomachine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
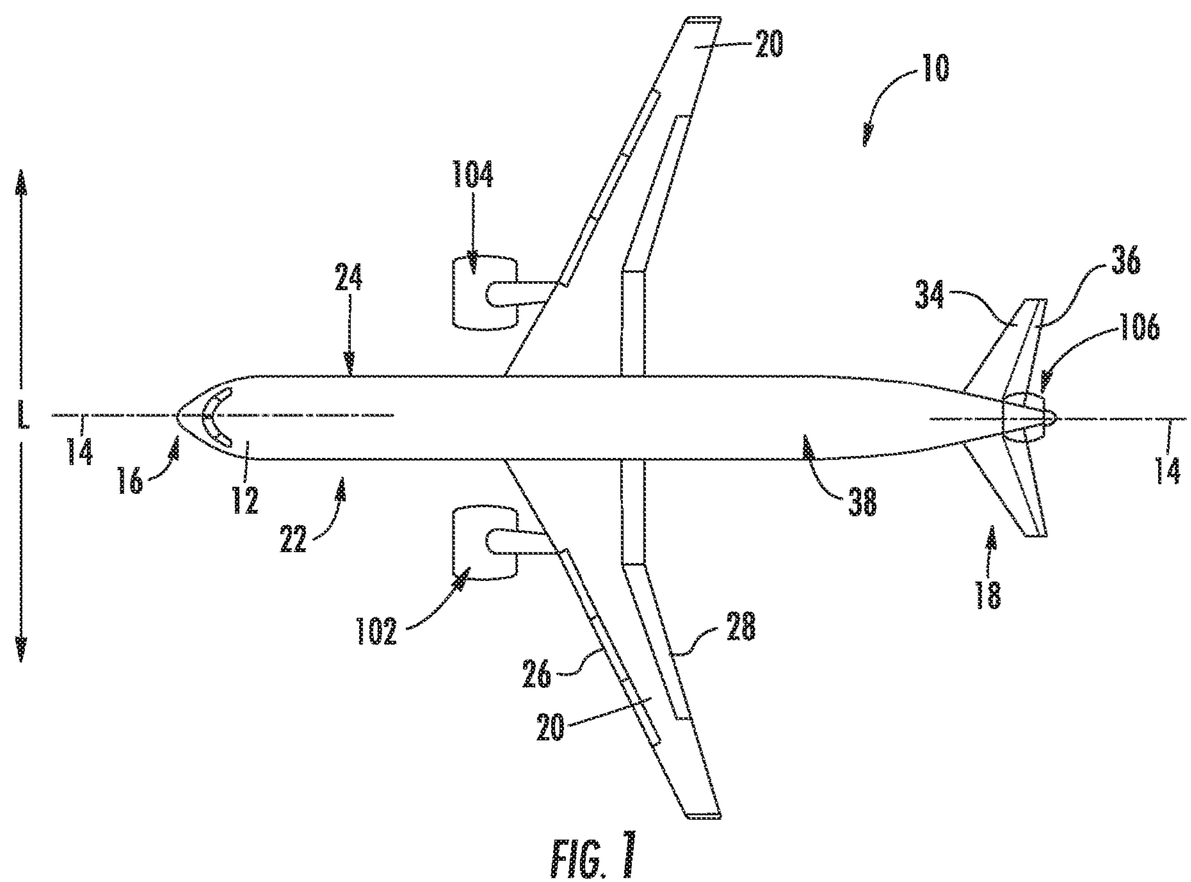
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within an engine or vehicle, and refer to the normal operational attitude of the engine vehicle. For example, with regard to an engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is related generally to a propulsion system for an aircraft having a turbomachine, an electric machine, and a propulsor. The electric machine and the turbomachine are each mechanically coupled to the propulsor. In certain operations, the turbomachine is configured to drive the propulsor, while in other operations, the electric machine is configured to drive the propulsor. When the electric machine drives the propulsor, the turbomachine may be shut off, and in at least certain exemplary embodiments, variable geometry components may be actuated to close off an airflow to the turbomachine. Additionally, the electric machine may be an electric motor/generator further configured to extract electrical power from the turbomachine when the turbomachine is operating, or alternatively the propulsion system may include a separate electric generator configured to extract electrical power from the turbomachine when the turbomachine is operating.

Figure 2:
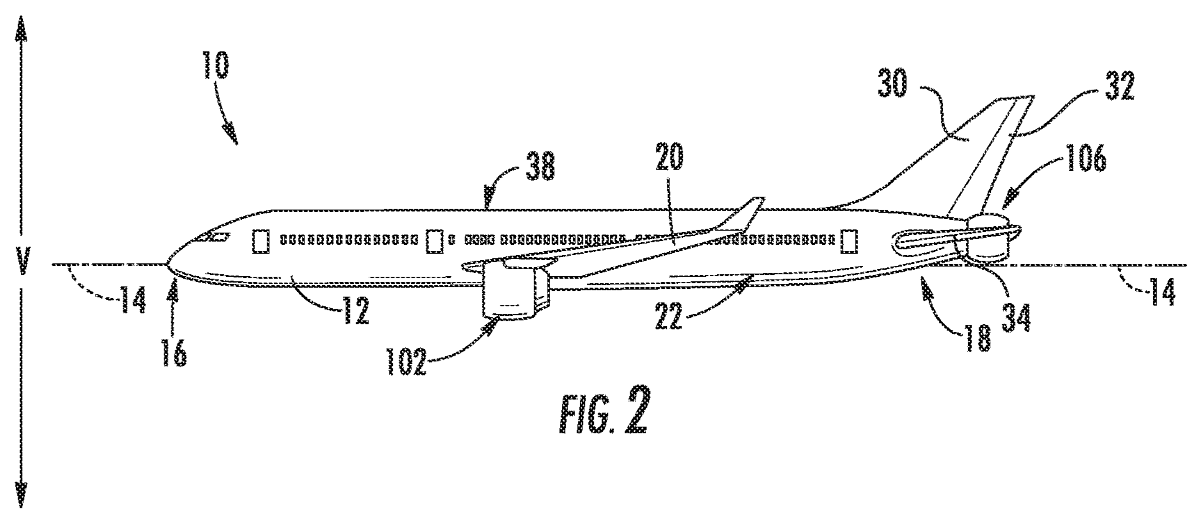
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18.

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100. The exemplary propulsion system 100 includes one or more aircraft engines and one or more hybrid-electric propulsion engines. For example, the embodiment depicted includes a plurality of aircraft engines, each configured to be mounted to the aircraft 10, such as to one of the pair of wings 20, and a hybrid-electric propulsion engine 106. More specifically, for the embodiment depicted, the aircraft engines are configured as gas turbine engines, or rather as turbofan jet engines 102, 104 attached to and suspended beneath the wings 20 in an under-wing configuration. Additionally, the hybrid-electric propulsion engine 106 is configured to be mounted at the aft end of the aircraft 10, and hence the hybrid-electric propulsion engine depicted may be referred to as an "aft engine." Further, the hybrid-electric propulsion engine depicted is configured to ingest and consume air forming a boundary layer over the fuselage 12 of the aircraft 10. Accordingly, the exemplary hybrid electric propulsion engine 106 depicted may further be referred to as a boundary layer ingestion (BLI) fan. The hybrid electric propulsion engine 106 is mounted to the aircraft 10 at a location aft of the wings 20 and/or the jet engines 102, 104. Specifically, for the embodiment depicted, the hybrid electric propulsion engine 106 is fixedly connected to the fuselage 12 at the aft end 18, such that the hybrid electric propulsion engine 106 is incorporated into or blended with a tail section at the aft end 18.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the hybrid electric propulsion engine 106 may alternatively be positioned at any suitable location proximate the aft end 18 of the aircraft 10. Further, in still other embodiments the hybrid electric propulsion engine 106 may not be positioned at the aft end 18 of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream injection fan.

Figure 3:
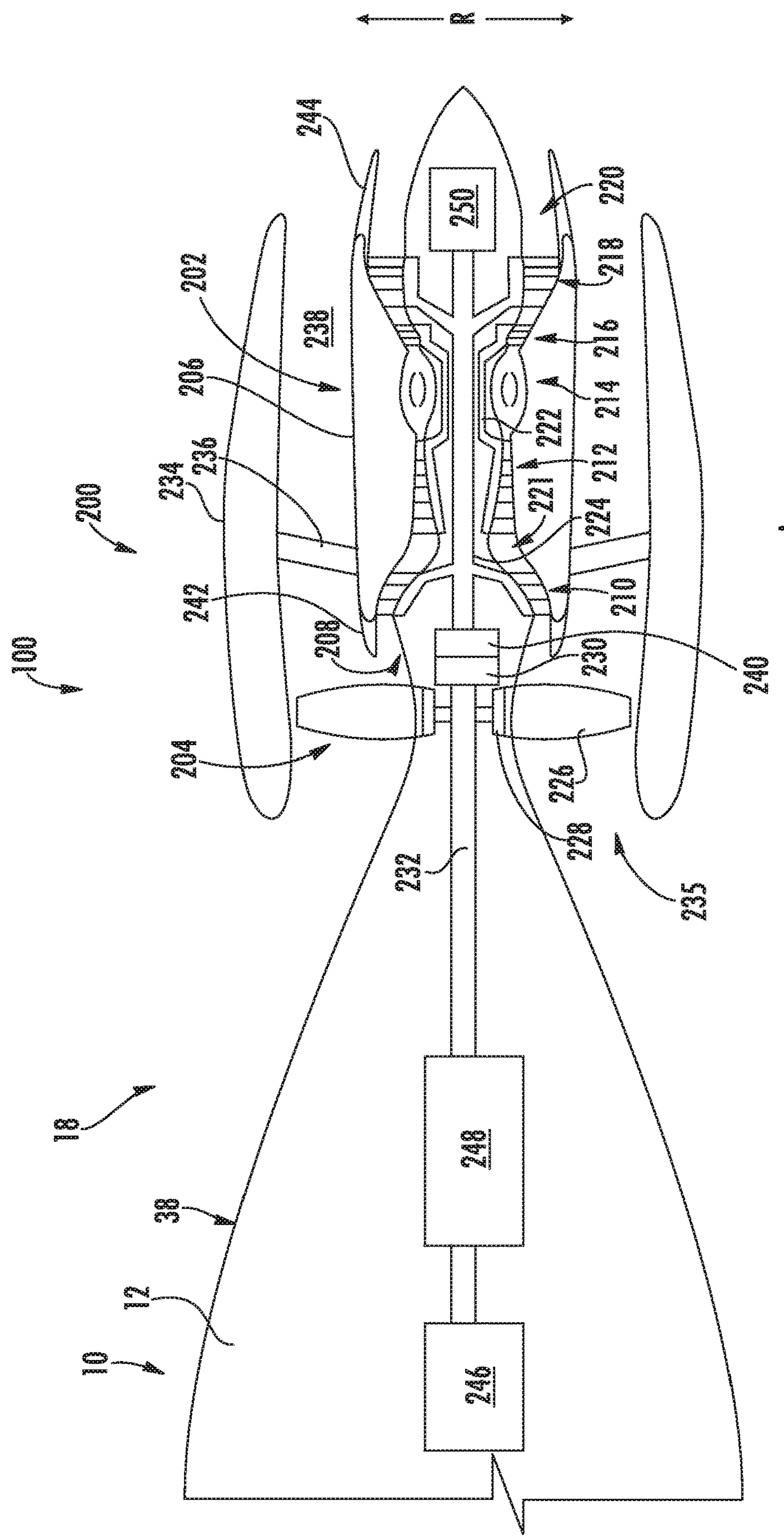
FIG. 3 is a schematic view of a propulsion system for an aircraft in accordance with an exemplary embodiment of the present disclosure, with one or more variable geometry components in an open position.

Referring now to FIG. 3, a schematic cross-sectional view of a hybrid electric propulsion engine 200 in accordance with an exemplary embodiment of the present disclosure is provided. For example, the exemplary hybrid electric propulsion engine 200 of FIG. 3 may be configured as the exemplary hybrid electric aircraft engine 106 described above with reference to FIGS. 1 and 2. Accordingly, it will be appreciated that the exemplary hybrid electric propulsion engine 200 of FIG. 3 includes components configured as an aft fan, and more particularly, as an aft, boundary layer ingestion fan configured to ingest a boundary layer airflow over at least a portion of a fuselage 12 of an aircraft 10 during operation (discussed in greater detail below).

As is depicted, the hybrid electric propulsion engine 200 includes a combustion engine, which for the embodiment of FIG. 3 is configured as a turbomachine 202, and a propulsor, which for the embodiment of FIG. 3 is configured as a fan 204. Additionally, as is shown in FIG. 3, the hybrid electric propulsion engine 200 defines an axial direction A (extending parallel to a longitudinal centerline) and a radial direction R.

The exemplary turbomachine 202 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a first, high pressure (HP) turbine 216 and a second, low pressure (LP) turbine 218; and a jet exhaust nozzle section 220. The LP compressor 210, HP compressor 212, combustion section 214, HP turbine 216, and LP turbine 218 together define at least in part a core air flowpath 221 through the turbomachine 202.

The exemplary turbomachine 202 of the hybrid electric propulsion engine 200 additionally includes one or more shafts rotatable with at least a portion of the turbine section and, for the embodiment depicted, at least a portion of the compressor section. More particularly, for the embodiment depicted, the hybrid electric propulsion engine 200 includes a high pressure (HP) shaft or spool 222, which drivingly connects the HP turbine 216 to the HP compressor 212. Additionally, the exemplary hybrid electric propulsion engine 200 includes a low pressure (LP) shaft or spool 224, which drivingly connects the LP turbine 218 to the LP compressor 210.

Further, the exemplary fan 204 includes a plurality of fan blades 226 coupled to a disk 228 in a spaced apart manner. The fan blades 226 extend outwardly from disk 228 generally along the radial direction R. The fan 204 is mechanically coupled to the LP shaft 224, such that the fan 204 is mechanically driven by the second, LP turbine 218. More particularly, the fan 204, including the fan blades 226 and disk 228, is mechanically coupled to the LP shaft 224 through a power gearbox 230, and is rotatable about the longitudinal axis by the LP shaft 224 across the power gearbox 230. More specifically, the hybrid electric propulsion engine 200 further includes a fan shaft 232 coupled to the LP shaft 224 across the power gearbox 230, with the plurality of fan blades 226 and disk 228 mechanically coupled to the fan shaft 232. As will be appreciated, the power gearbox 230 includes a plurality of gears for modifying a rotational speed of the fan shaft 232 relative to the LP shaft 224. Accordingly, the fan 204 is powered by an LP system (including the LP turbine 218) of the turbomachine 202.

Referring still to the exemplary embodiment of FIG. 3, the hybrid electric propulsion engine 200 includes an annular fan casing or outer nacelle 234 that circumferentially surrounds the fan 204 and/or at least a portion of the turbomachine 202. Accordingly, the exemplary hybrid electric propulsion engine 200 depicted may be referred to as being "ducted." Further, the nacelle 234 is supported relative to the turbomachine 202 by a plurality of circumferentially-spaced outlet guide vanes 236. A downstream section of the nacelle 234 extends over an outer portion of the turbomachine 202 so as to define a bypass airflow passage 238 therebetween.

Moreover, for the embodiment depicted, the hybrid electric propulsion engine 200 is mounted to an aft end 18 of an aircraft 10. Accordingly, for the embodiment depicted, the fan 204 is configured as an aft fan. More particularly, for the embodiment depicted, the hybrid electric propulsion engine 200 is mounted to an aft end 18 of the fuselage 12 of the aircraft 10, with an inlet 235 defined by the outer nacelle 234 surrounding the fuselage 12 such that the hybrid electric propulsion engine 200 may ingest and consume boundary layer airflow over at least a portion of the aircraft 10 (i.e., for the embodiment depicted, over the fuselage 12 of the aircraft 10). In such a manner, the fan 204 is further configured as a boundary layer ingestion fan.

Notably, for the embodiment of FIG. 3, the hybrid electric propulsion engine 200 further includes a clutch 240 and one or more variable geometry components positioned at the inlet 208 to the turbomachine 202, at the exhaust 220 of the turbomachine 202, or both. The clutch 240 is configured to selectively mechanically couple the LP shaft 234 to the fan shaft 232 and mechanically decouple the LP shaft 234 from the fan shaft 232. For example, when the clutch 240 is in an engaged position, the LP shaft 234 may be fixedly coupled to the fan shaft 232, such that rotation of the LP shaft 234 correspondingly rotates the fan shaft 232, and vice versa. By contrast, when the clutch 240 is in a disengaged position, the fan shaft 232 is decoupled from the LP shaft 234, such that the fan shaft 232 and the LP shaft 234 may rotate independently of one another.

Figure 4:
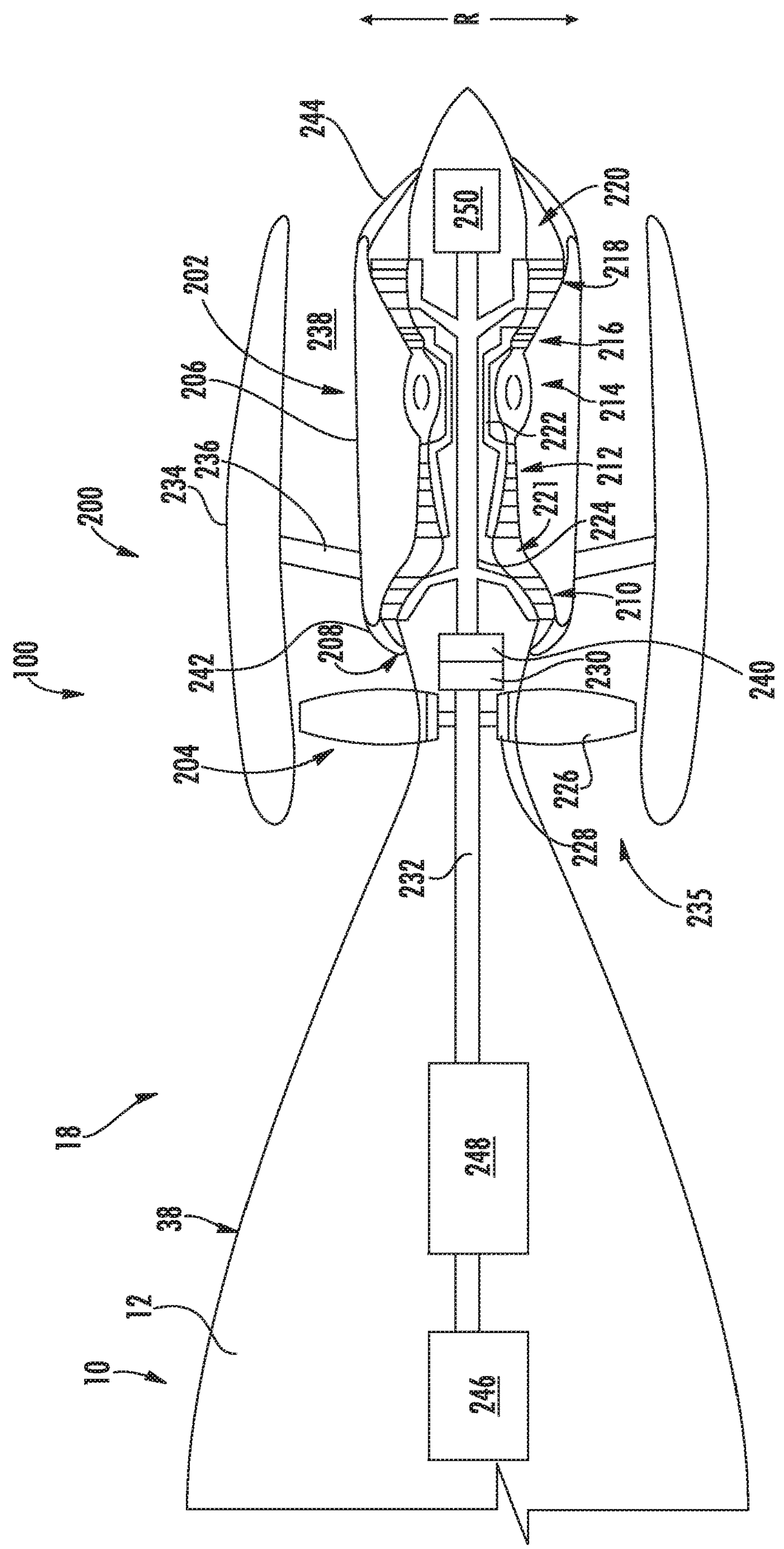
FIG. 4 is a schematic view of the exemplary propulsion system of FIG. 3, with the one or more variable geometry components in a closed position.

Additionally, referring now also to FIG. 4, providing another view of the exemplary hybrid electric propulsion engine 200 of FIG. 3, the one or more variable geometry components include a forward variable geometry component 242 and an aft variable geometry component 244. The forward variable geometry component 242 is movable between an open position (FIG. 3) and a closed position (FIG. 4) generally along the radial direction R, for the embodiment depicted. The forward variable geometry component 242 is configured for at least partially closing off the inlet 208 of the turbomachine 202 during certain operating conditions when in the closed position. Similarly, the aft variable geometry component 244 is movable between an open position (FIG. 3) and a closed position (FIG. 4) also generally along the radial direction R, for the embodiment depicted. The aft variable geometry component 244 is configured for at least partially closing off the exhaust 220 of the turbomachine 202 during certain operating conditions when in the closed position. More particularly, for the configuration depicted in FIGS. 3 and 4, the forward and aft variable geometry components 242, 244 substantially completely close off the inlet 208 and the exhaust 220, respectfully, when in the closed positions. Accordingly, it will be appreciated that when the forward and aft variable geometry components 242, 244 are each in the open positions, a portion of an airflow, such as a boundary layer airflow, through the inlet 235 of the outer nacelle 234 may flow through the inlet 208 of the turbomachine 202, and further may flow out through the exhaust 220 of the turbomachine 202. By contrast, when the forward and aft variable geometry components 242, 244 are each in the closed positions, substantially no airflow from the inlet 235 of the outer nacelle 234 may flow through the inlet 208 of the turbomachine 202 or out through the exhaust 220 of the turbomachine 202. In such a manner, the forward and aft variable geometry components 242, 244 may effectively shut off all airflow through the turbomachine 202 when in the closed positions.

Although for the embodiment depicted the forward and aft variable geometry components 242, 244 each include a plurality of flaps for closing off the inlet 208 and the exhaust 220, respectively, in other exemplary embodiments, any other suitable variable geometry components may be utilized.

Moreover, it will be appreciated that in at least certain exemplary embodiments, the clutch 240, the forward variable geometry component 242, and the aft variable geometry component 244 may each be operably connected to a controller (not depicted) of the hybrid electric propulsion engine 200, of a propulsion system including the hybrid electric propulsion engine 200 (such as propulsion system 100), or of an aircraft 10 incorporating the hybrid electric propulsion engine 200. In such a manner, the controller (not depicted) may selectively couple and decouple the fan shaft 232 to or from the LP shaft 234, and further may move the forward and aft variable geometry components 242, 244 between the open positions and closed positions.

Referring still to FIGS. 3 and 4, the hybrid-electric propulsion engine 200 further includes an electrical system. Utilizing such electrical system, the propulsion system including the hybrid electric propulsion engine 200 is operable between a combustion operating mode and an electric operating mode.

For the embodiment of FIGS. 3 and 4, the electrical system generally includes an electrical power source 246, a first electric machine 248, and a second electric machine 250. The first electric machine 248 is electrically coupled to the electrical power source 246 such that it may receive electrical power from the electrical power source 246. Moreover, the first electric machine 248 is mechanically coupled to the fan 204, or more particularly, for the embodiment depicted, is mechanically coupled to the fan 204 through the fan shaft 232. The second electric machine 250 is mechanically coupled to the turbomachine 202 and further is electrically coupled to the electrical power source 246. Notably, for the embodiment depicted, the electrical power source 246 is an electric energy storage unit, the first electric machine 248 is configured as an electric motor, and the second electric machine 250 is configured as an electric generator. The electrical power source 246 and first electric machine 248 are each positioned, for the embodiment depicted, within the fuselage 12 of the aircraft 10 when installed with the aircraft 10, while, for the embodiment depicted, the second electric machine 250 is positioned within an aft end of the turbomachine 202. More specifically, for the embodiment depicted, the second electric machine 250 is mounted coaxially with the LP shaft 234 at a location inward of the core air flowpath 221 of the turbomachine 202, and aft of the combustion section 214 of the turbomachine 202.

As stated, the propulsion system including the hybrid electric propulsion engine 200 is operable between the combustion operating mode and the electric operating mode. Referring particularly to FIG. 3, depicting the propulsion system operating in the combustion operating mode, when operating in the combustion operating mode, the forward and aft variable geometry components 242, 244 are in the open positions. In such a manner, air may flow through the inlet 208 of the turbomachine 202 into the turbomachine 202, and further may flow out of the turbomachine 202 through the exhaust 220 of the turbomachine 202. Additionally, when the propulsion system is operating in the combustion operating mode, the clutch 240 is in the engaged position to mechanically couple the turbomachine 202 and the fan 204. More specifically, the clutch 240 is in the engaged position to mechanically couple the LP shaft 234 of the turbomachine 202 to the fan shaft 232, such that rotation of the LP shaft 234 correspondingly rotates the fan shaft 232 and fan 204. Additionally, the second electric machine 250, being coupled to the LP shaft 234, is driven by the turbomachine 202, and more specifically, is driven by the LP shaft 234 of the turbomachine 202 during operation of the propulsion system in the combustion mode operation. In such a manner, the second electric machine 250 may generate an amount of electrical power when the propulsion system is operating in the combustion operating mode, and further may transfer at least a portion of such electrical power to the electrical power source 246 (i.e., the electric energy storage unit for the embodiment depicted).

By contrast, referring now particularly to FIG. 4, depicting the propulsion system, including the hybrid electric propulsion engine 200, operating in the electric operating mode, when operating in the electric operating mode, the forward and aft variable geometry components 242, 244 are in the closed positions and the clutch 240 is in the disengaged position. In such a manner, air is prevented from flowing into the turbomachine 202 through the inlet 208 of the turbomachine 202 and further is prevented from flowing out of the turbomachine 202 through the exhaust 220 of the turbomachine 202. Moreover, the clutch 240 is in the disengaged position such that the turbomachine 202 is mechanically decoupled from the propulsor (i.e., the fan 204 for the embodiment depicted), or more particularly, such that the LP shaft 234 is mechanically decoupled from the fan shaft 232, such that the fan shaft 232 may rotate independently of the LP shaft 234. Further, when operating in the electric operating mode, electrical power from the electrical power source 246 may be transferred to the first electric machine 248 (configured as an electric motor for the embodiment depicted) such that the first electric machine 248 may drive the fan shaft 232, and further may drive the fan 204 to provide a propulsive benefit for the aircraft 10. In such a manner, the first electric machine 248 drives the fan 204 of the hybrid electric propulsion engine 200 during the electric operating mode of the propulsion system including hybrid electric propulsion engine 200.

Notably, as will be discussed in further detail below, it should be appreciated that in still other exemplary embodiments of the present disclosure the propulsion system 100 may further operate in a windmilling operating mode. In such an operating mode, the propulsion system 100 may utilize the hybrid electric propulsion engine 200 essentially as an air brake. For example, in at least certain exemplary aspects, when operating in the windmilling operating mode, the hybrid electric propulsion engine 200 may move or maintain the forward and aft variable geometry components 242, 244 to, or in, the closed positions, and further may move or maintain the clutch 240 to, or in, the disengaged position. However, instead of driving the fan 204 using the first electric machine 248, the electrical system may extract power from the fan 204 using the first electric machine 248. More particularly, the first electric machine 248 may instead operate as an electric generator, extracting electrical power from rotation of the fan 204 due to an ambient airflow across the fan 204. In such a manner, the first electric machine 248 may act as a drag on the fan shaft 232, which in turn acts as a drag on the fan 204, which in turn acts as a drag on the aircraft 10. The electrical power extracted using the first electric machine 248 may be provided to, e.g., the electrical power source 246, or any other electrical power sink.

In such a manner, the propulsion system 100 may generally be more efficient in that during, e.g., relatively low power output operating modes, such as cruise operating modes, as the propulsion system 100 may operate in the electric operating mode to operate the hybrid electric propulsion engine 200 solely on electrical power. By contrast, during relatively high power operating modes, such as during takeoff or top of climb operating modes, the propulsion system 100 may operate in a combustion operating mode to provide an increase power output, and store any excess power for usage during the electric operating mode.

It should be appreciated, however, that in other exemplary embodiments, the hybrid electric propulsion engine 200, and propulsion system as a whole, may be configured in any other suitable manner. For example, in other exemplary embodiments, the turbomachine 202 may have any other suitable configuration, such as any other suitable number of compressors or turbines, spools, etc. Further, although depicted as a ducted hybrid electric propulsion engine 200, in other exemplary embodiments, the engine may be unducted. Further, in other exemplary embodiments, the hybrid electric propulsion engine 200 may have components mounted, or stored, in any other suitable manner or location. For example, instead of the turbomachine 202 being mounted in a cantilevered manner, such as shown, in other exemplary embodiments, the turbomachine 202 may be position at least partially within the fuselage 12 of the aircraft 10.

Further, in still other exemplary embodiments of the present disclosure, the propulsion system 100 may utilize any other suitable electrical power source 246. For example, referring now to FIGS. 5 and 6, another exemplary embodiment of the present disclosure is provided. Specifically, FIG. 5 provides a top, schematic view of an aircraft 10 incorporating a propulsion system 100 in accordance with another exemplary embodiment of the present disclosure; and FIG. 6 provides a side, schematic view of a hybrid electric propulsion engine 200 as may be incorporated into the exemplary propulsion system 100 depicted in FIG. 5.

Figure 5:
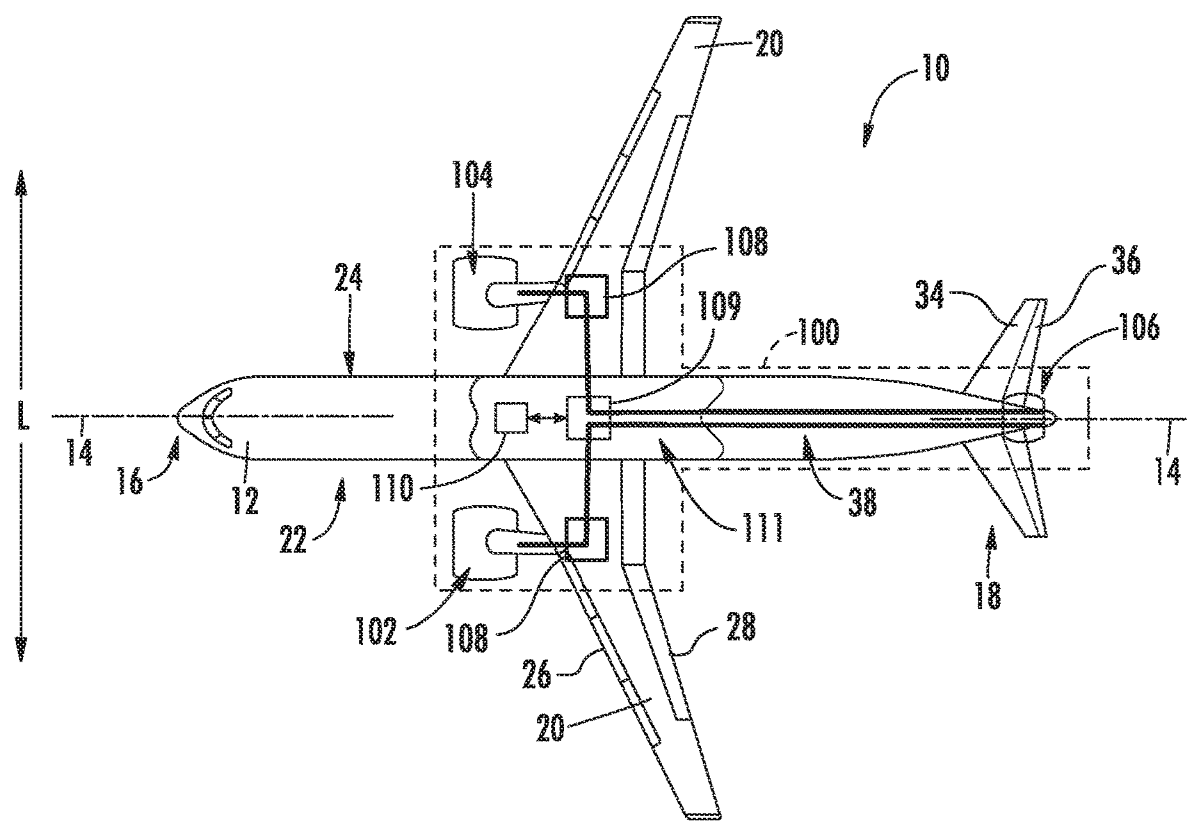
FIG. 5 is a top view of an aircraft according to various exemplary embodiments of the present disclosure.
Figure 6:
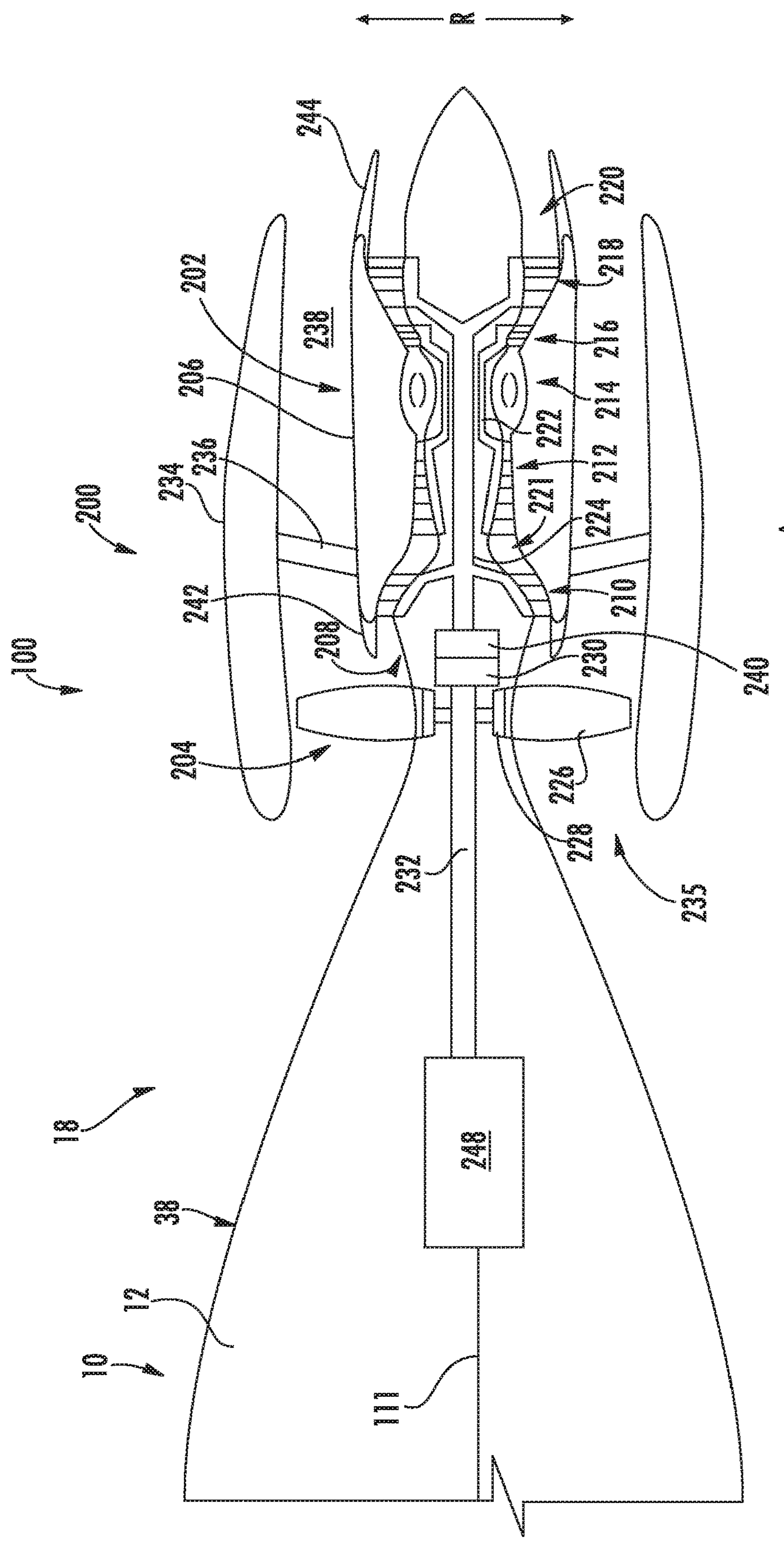
FIG. 6 is a schematic view of a propulsion system for an aircraft in accordance with another exemplary embodiment of the present disclosure.

Referring first particularly to FIG. 5, the exemplary aircraft 10 depicted may be configured in substantially the same manner as exempt exemplary aircraft 10 described above with reference to FIGS. 1 and 2. For example, the aircraft 10 generally defines a longitudinal centerline 14 that extends therethrough, a vertical direction V, a lateral direction L, a forward end 16, and an aft end 18. Moreover, the aircraft 10 includes a fuselage 12, extending longitudinally from the forward end 16 of the aircraft 10 towards the aft end 18 of the aircraft 10, and a pair of wings 20. The first of such wings 20 extends laterally outwardly with respect to the longitudinal centerline 14 from a port side 22 of the fuselage

12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer having a rudder flap for yaw control (not shown), and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V and/or horizontal/lateral direction L.

Moreover, the exemplary aircraft 10 includes the propulsion system 100. As with the exemplary embodiment of FIGS. 1 and 2, the exemplary propulsion system 100 of FIG. 5 includes one or more aircraft engines and one or more hybrid-electric propulsion engines. For example, the embodiment depicted includes a plurality of aircraft engines, each configured to be mounted to the aircraft 10, such as to one of the pair of wings 20, and a hybrid-electric propulsion engine 106. More specifically, for the embodiment depicted, the aircraft engines are configured as gas turbine engines, or rather as turbofan jet engines 102, 104 attached to and suspended beneath the wings 20 in an under-wing configuration.

However, for the embodiment of FIGS. 5 and 6, the propulsion system 100 further includes one or more electric generators 108 operable with the jet engines 102, 104. For example, one or both of the jet engines 102, 104 may be configured to provide mechanical power from a rotating shaft (such as an LP shaft or an HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the hybrid electric propulsion engine 106. For the embodiment depicted, the electric generators 108, power conditioner 109, energy storage device 110, and hybrid electric propulsion engine 106 are all are connected to an electric communication bus 111, such that the electric generator 108 may be in electrical communication with the hybrid electric propulsion engine 106 and/or the energy storage device 110, and such that the electric generator 108 may provide electrical power to one or both of the energy storage device 110 or the hybrid electric propulsion engine 106.

Referring now particularly to FIG. 6, an exemplary embodiment of a hybrid electric propulsion engine 200 in accordance with another embodiment of the present disclosure is provided. The exemplary hybrid electric propulsion engine 200 of FIG. 6 may be incorporated into the exemplary propulsion system 100 of FIG. 5 (e.g., as hybrid electric propulsion engine 106) and further may be configured in substantially the same manner as exemplary hybrid electric propulsion engine 200 described above with reference to FIGS. 3 and 4. For example, the hybrid electric propulsion engine 200 generally includes a turbomachine 202 and a fan 204. For the embodiment depicted, the fan 204 is configured as an aft fan, and more specifically, as a boundary layer ingestion fan.

Additionally, the exemplary hybrid electric propulsion engine 200 includes an electrical system. The electrical system includes a first electric machine 248 and an electrical power source 246. By contrast to the exemplary embodiment of FIGS. 3 and 4, however, for the embodiment of FIG. 6, the electrical power source 246 is not a dedicated electrical energy storage unit. Instead, the first electric machine 248 is electrically coupled to the power bus 111, such that the first electric machine 248 may receive electrical power from, e.g., one or more of the electric generators 108, or the electric energy storage unit 210. Accordingly, for the embodiment of FIGS. 3 and 4, the electrical power source 246 of the electrical system of the hybrid electric propulsion engine 200 may be the electric energy storage device 110, the electric generators 108, or a combination of the two.

Additionally, for the embodiment depicted, the electrical system does not necessarily require a second electric machine 250 dedicated to generating electrical power for the hybrid electric propulsion engine 200. Instead, the hybrid electric propulsion engine 200 may receive electrical power through the power bus 111, or alternatively, the first electric machine 248 may be configured as a motor/generator such that it may extract electrical power from the turbomachine 202 when the propulsion system 100 is operating in the combustion fight mode (or in the windmilling operations mode), and further may provide power to the fan 204 to drive the fan 204 when operating in the electric operating mode.

Figure 7:
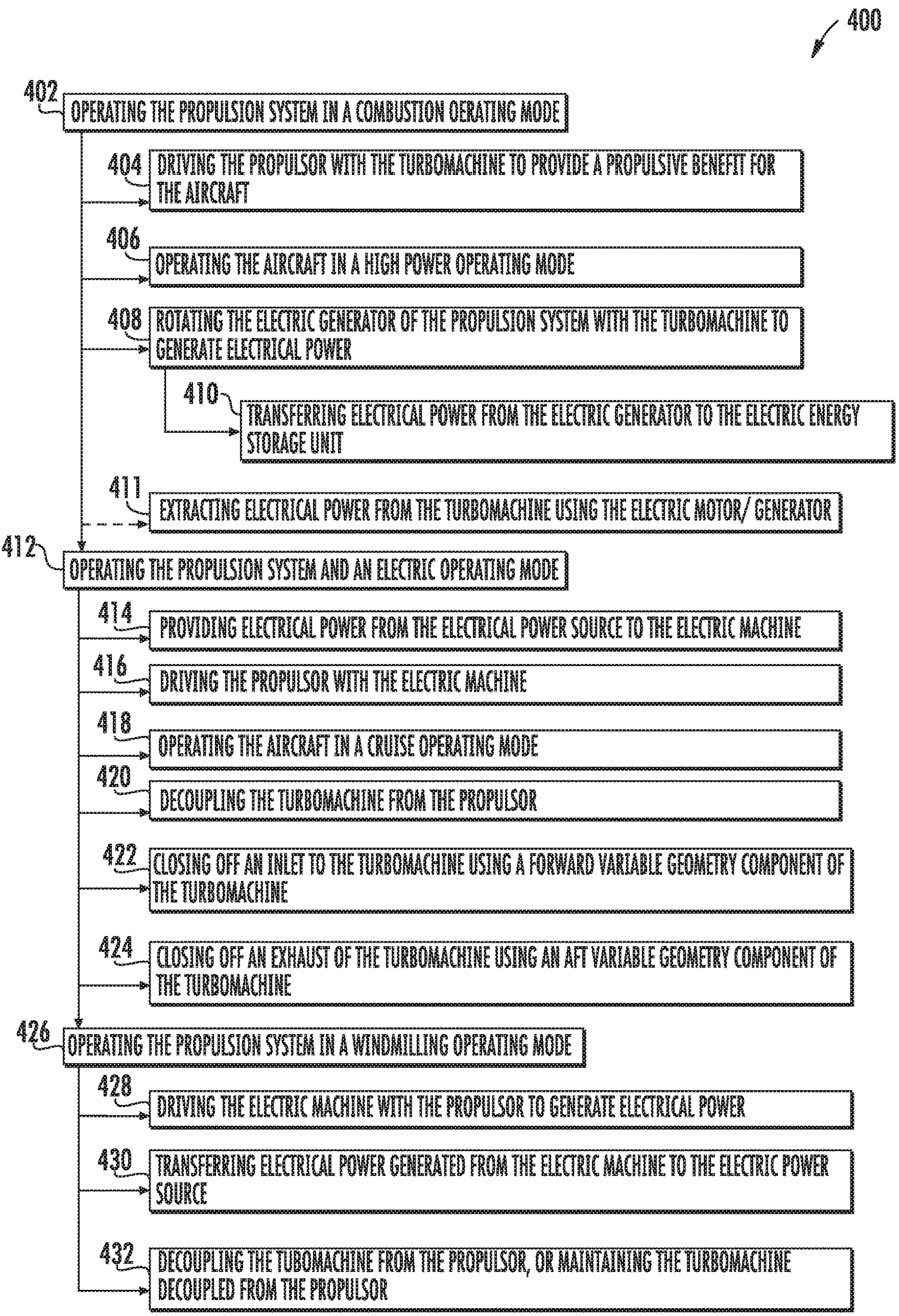
FIG. 7 is a flow diagram of a method for operating a hybrid electric propulsion engine of a propulsion system of an aircraft in accordance with an exemplary aspect of the present disclosure

Referring now to FIG. 7, a flow diagram is provided of a method 400 for operating a hybrid electric propulsion engine of a propulsion system of an aircraft in accordance with an exemplary aspect of the present disclosure. The exemplary method 400 described in FIG. 7 may be utilized to operate one or more the exemplary hybrid electric propulsion engines described above with reference to FIGS. 1 through 6. In such a manner, the hybrid electric propulsion engine may generally include a propulsor (e.g., a fan), a turbomachine, an electric power source, and an electric machine.

The method 400 generally includes at (402) operating the propulsion system in a combustion operating mode. Operating the propulsion system the combustion operating mode at (402) includes at (404) driving the propulsor with the turbomachine to provide a propulsive benefit for the aircraft. Notably, in at least certain exemplary aspects, driving the propulsor with the turbomachine to provide the propulsive benefit for the aircraft at (404) may include coupling the propulsor to the turbomachine (e.g., coupling the turbomachine to the propulsor at by moving a clutch to an engaged position such that a shaft of the turbomachine rotates a fan shaft connected to the fan).

Moreover, for the exemplary aspect depicted, operating the propulsion system in the combustion operating mode at (402) further includes at (406) operating the aircraft in a high power operating mode. For example, in certain exemplary aspects, the high power operating mode may be a takeoff operating mode. Alternatively, however, the high power operating mode may be any other operating mode of the aircraft requiring a relatively large amount of thrust. In such a manner, it will be appreciated that the propulsion system may generally produce an increased amount of thrust while operating in the combustion operating mode at (402).

Moreover, for the exemplary aspect of the method 400 depicted FIG. 7, the electrical machine is a first electrical machine, and the hybrid electric propulsion engine further includes a second electrical machine—the second electrical machine configured as an electrical generator. With such an exemplary aspect, operating the propulsion system in the combustion operating mode at (402) further includes at (408) rotating the electric generator of the propulsion system with the turbomachine to generate electrical power. More specifically, in at least certain exemplary aspects, the electrical power source may be an electric energy storage unit and rotating the electric generator with the turbomachine to generate electrical power at (408) may further include at (410) transferring electrical power from the electric generator to the electric energy storage unit. In such a manner, the propulsion system may generally extract electrical power from the turbomachine when operating in the combustion operating mode.

Notably, however in other exemplary aspects, the first electric machine may be configured as an electrical motor/generator configured to extract electrical power from the turbomachine during the combustion operating mode (see, e.g., FIG. 6). For example, as is depicted in phantom, in at least certain (alternative) exemplary aspects, the electric machine may be configured as an electric motor/generator, and operating the propulsion system in the combustion operating mode at (402) may further include at (411) extracting electrical power from the turbomachine using the electric motor/generator.

Moreover, the exemplary aspect of the method 400 depicted in FIG. 7 further includes at (412) operating the propulsion system and an electric operating mode. Operating the propulsion system in the electric operating mode at (412) may occur subsequent to, or prior to, operating the propulsion system in the combustion operating mode at (402). As is depicted, operating the propulsion system in the electric operating mode at (412) includes at (414) providing electrical power from the electrical power source to the electric machine (i.e., the first electric machine for the aspect depicted), and at (416) driving the propulsor with the electric machine (i.e., the first electric machine for the aspect depicted). For example, the method 400 may substantially completely drive the propulsor with the electric machine when operating the propulsion system in the electric operating mode at (412). Notably, at least certain exemplary aspects, such as the exemplary aspect of the method 400 depicted, operating the propulsion system in the electric operating mode at (412) includes at (418) operating the aircraft in a cruise operating mode.

Moreover, it will be appreciated that when operating the propulsion system in the electric operating mode at (412), the method 400 may generally shut down (and shut off) the turbomachine. For example, for the exemplary aspect depicted, operating the propulsion system in the electric operating mode at (412) further includes at (420) decoupling the turbomachine from the propulsor, at (422) closing off an inlet to the turbomachine using a forward variable geometry component of the turbomachine, and at (424) closing off an exhaust of the turbomachine using an aft variable geometry component of the turbomachine. In such a manner, airflow may be routed around the turbomachine such that no air is permitted to flow into or out of the turbomachine. Notably, in at least certain exemplary aspects, decoupling the turbomachine from the propulsor at (420) may generally include moving a clutch to a disengaged position such that a shaft of the turbomachine may rotate independently of a fan shaft connected to the fan. By disengaging the turbomachine from the fan during operation of the propulsion system in the electric operations mode at (412), the fan may be rotated with less resistance, and thus may be rotated more efficiently.

Furthermore, referring still to the exemplary aspect of the method 400 depicted in FIG. 7, the method 400 further includes at (426) operating the propulsion system in a windmilling operating mode. Operating the propulsion system in the windmilling operating mode at (426) includes at (428) driving the electric machine (i.e., the first electric machine for the aspect depicted) with the propulsor to generate electrical power and at (430) transferring electrical power generated at (426) from the electric machine (i.e., the first electric machine for the aspect depicted) to the electric power source. Additionally, for the exemplary aspect depicted, operating the propulsion system in the windmilling operating mode at (426) further includes at (432) decoupling the turbomachine from the propulsor, or maintaining the turbomachine decoupled from the propulsor. In such a manner, the turbomachine may remain shut down and shut off. Operating the propulsion system in the windmilling operating mode at (426) may allow for the propulsion system to act as an air brake, increasing a drag on the aircraft to slow down the aircraft during such operations, while also generating electricity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft, the propulsion system comprising:

a propulsor;

a turbomachine mechanically coupled to the propulsor for driving the propulsor during a combustion operating mode of the propulsion system and mechanically decoupled from the propulsor during an electric operating mode of the propulsion system;

an electrical power source; and an electric machine, the electric machine being electrically coupled to the electrical power source and mechanically coupled to the propulsor during the electric operating mode of the propulsion system such that the electric machine drives the propulsor during the electric operating mode of the propulsion system;

wherein the turbomachine defines an exhaust, and wherein the turbomachine comprises an aft variable geometry component for at least partially closing off the exhaust when the propulsion system is operating in the electric operating mode.

2. The propulsion system of claim 1, wherein the turbomachine defines an inlet, and wherein the turbomachine further comprises a forward variable geometry component for at least partially closing off the inlet when the propulsion system is operating in the electric operating mode.

3. The propulsion system of claim 1, wherein the aft variable geometry component is movable between an open position and a closed position along a radial direction.

4. The propulsion system of claim 1, wherein the propulsor is configured as an aft fan.

5. The propulsion system of claim 4, wherein the aft fan is a boundary layer ingestion fan configured to ingest a boundary layer airflow over at least a portion of the aircraft during operation.

6. The propulsion system of claim 1, wherein the electric machine is an electric motor configured to be positioned within a fuselage of the aircraft when installed.

7. The propulsion system of claim 1, wherein the electrical power source is an electric energy storage unit.

8. The propulsion system of claim 7, further comprising: an electric generator mechanically coupled to the turbomachine, wherein the electric generator is electrically coupled to the electric energy storage unit.

9. The propulsion system of claim 8, wherein the electric generator is positioned within an aft end of the turbomachine.

10. The propulsion system of claim 1, further comprising: a clutch configured to mechanically couple the turbomachine and the propulsor when the propulsion system is operable in the combustion operating mode, and is further configured to mechanically decouple the turbomachine from the propulsor when the propulsion system is operable in the electric operating mode.

11. The propulsion system of claim 1, wherein the electric machine is an electric motor/generator configured to generate electrical power when the propulsion system is in the combustion operating mode and further configured to drive the propulsor when the propulsion system is in the electrical operating mode.

12. A method for operating a propulsion system for an aircraft, the propulsion system comprising a propulsor, a turbomachine, an electrical power source, and an electric machine, the method comprising:

operating the propulsion system in a combustion operating mode, wherein operating the propulsion system in the combustion operating mode comprises driving the propulsor with the turbomachine to provide a propulsive benefit for the aircraft; and operating the propulsion system in an electric operating mode, wherein operating the propulsion system in the electric operating mode comprises providing electrical power from the electrical power source to the electric machine and driving the propulsor with the electric machine;

wherein the turbomachine defines an exhaust, and wherein the turbomachine comprises an aft variable geometry component for at least partially closing off the exhaust when the propulsion system is operating in the electric operating mode.

13. The method of claim 12, wherein operating the propulsion system in the electric operating mode further comprises decoupling the turbomachine from the propulsor.

14. The method of claim 12, wherein operating the propulsion system in the electric operating mode further comprises operating the aircraft in a cruise operating mode.

15. The method of claim 12, wherein operating the propulsion system in the combustion operating mode comprises operating the aircraft in a high power operating mode.

16. The method of claim 12, wherein the propulsion system further comprises an electrical generator, and wherein operating the propulsion system in the combustion operating mode comprises rotating the electric generator of the propulsion system with the turbomachine to generate electrical power.

17. The method of claim 16, wherein the electrical power source is an electric energy storage unit, and wherein rotating the electric generator with the turbomachine to generate electrical power comprises transferring electrical power from the electric generator to the electric energy storage unit.

18. The method of claim 12, wherein the electric machine is an electric motor/generator, wherein operating the propulsion system in the combustion operating mode further comprises extracting electrical power from the turbomachine using the electric motor/generator.

19. The method of claim 12, further comprising:

operating the propulsion system in a wind-milling operating mode, wherein operating the propulsion system in the windmilling operating mode comprises driving the electric machine with the propulsor to generate electrical power and transferring electrical power from the electric machine to the electrical power source.

20. The method of claim 12, wherein operating the propulsion system in the electric operating mode further comprises closing off an inlet to the turbomachine using a variable geometry component of the turbomachine.

* * * * *